April 25, 1961  
C. BARASSI  
PNEUMATIC TIRE WITH SEPARATE TREAD RINGS  
AND INSERTABLE METALLIC ELEMENTS  
Filed Oct. 19, 1959

2,981,302

INVENTOR  
Carlo Barassi

BY  
Stevens, Davis, Miller & Mosher  
ATTORNEYS

United States Patent Office 2,981,302
Patented Apr. 25, 1961

2,981,302

PNEUMATIC TIRE WITH SEPARATE TREAD RINGS AND INSERTABLE METALLIC ELEMENTS

Carlo Barassi, Milan, Italy, assignor to Pirelli S.p.A., Milan, Italy

Filed Oct. 19, 1959, Ser. No. 847,186

Claims priority, application Italy May 13, 1959

5 Claims. (Cl. 152—211)

The present invention relates to a vehicle tire of the pneumatic type which is advantageously suited for use on ice and snow. More particularly, this invention pertains to a tire of the above type wherein there are employed a plurality of removable tread rings which may be received in suitable annular grooves or seats located in the peripheral portion of the tire casing; the tire is designed to receive a plurality of insertable metallic elements having ground-contacting portions, the metallic elements being held against the tire casing by means of the removable tread rings. This application is a continuation-in-part of my prior co-pending application Serial No. 661,338, filed on May 24, 1957, now Patent No. 2,953,181, dated September 20, 1960.

The invention described in the aforementioned co-pending application relates to a vehicle tire in which there is a single removable tread ring; the tire casing is correspondingly provided with a single groove on its peripheral portion for receiving the single tread ring. This annular groove in the casing is provided with a plurality of circumferentially spaced depressions or recesses into which suitable metallic elements may be inserted. The metallic elements are thus held in position by means of the tread ring.

The present invention, as distinguished from the prior invention, involves a plurality of separate tread rings which are received in a corresponding plurality of annular grooves in the peripheral portion of the tire carcass. The longitudinal ridges which separate the adjacent grooves are provided with circumferentially spaced interruptions, each interruption having a width corresponding to the length of the insertable metallic element which is to be employed in conjunction with the present invention.

In accordance with the present invention, each metallic element is substantially T-shaped. Each element is inserted between and beneath two adjacent rings which then bear against the two arms of the T to hold the element firmly against the carcass.

As distinguished from the prior invention, it is unnecessary to provide recesses or depressions in the annular grooves because the normal elasticity of the rubber is sufficient to encase the horizontal edges of the metallic element. When more than two tread rings are employed, the metallic elements are preferably situated between the various pairs of rings in a staggered relationship. In any event, it is advisable to have at least one metallic element in the impression area of the tire.

The carcass with which the present invention is associated is preferably of the radial type. The removable tread rings are provided with resistance elements which render these rings substantially inextensible in the longitudinal direction. Also, the carcass is preferably provided with a conventional breaker strip formed of sheer cords, crossed and inclined with respect to the midcircumferential plane of the tire at an angle ranging from about 35° to 60°.

Therefore, it is a principal object of the present invention to provide a tire of the type described above including a carcass having a plurality of separate tread rings received in suitable annular grooves in the carcass and a plurality of T-shaped metallic elements which are insertable between adjacent tread rings and held against the carcass by means of the tread rings.

Other and further objects and advantageous features of the present invention will hereafter more fully appear in connection with a detailed description of the drawings in which.

Figure 1:
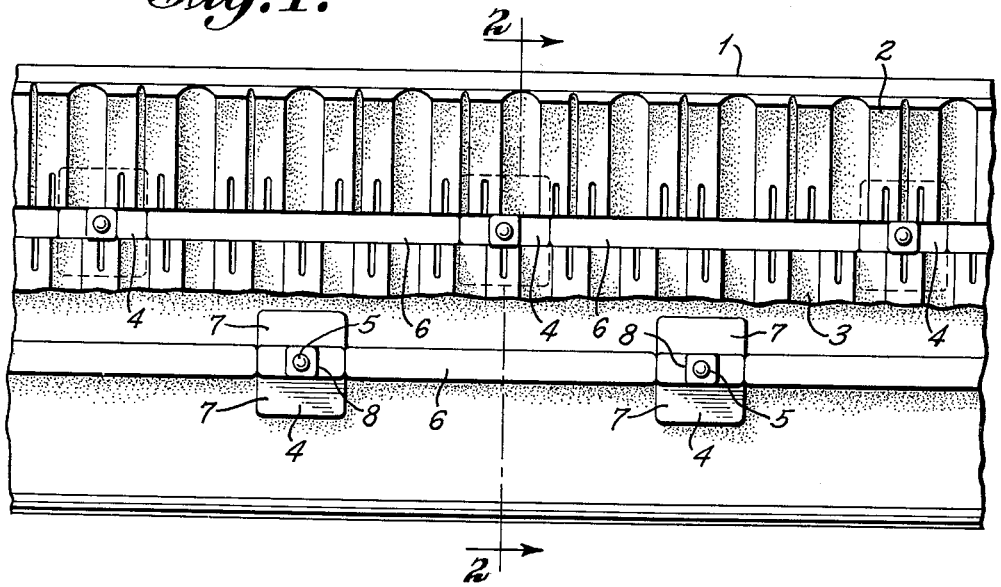
Figure 1 represents a plane development of a circumferential portion of a tire embodying the present invention; the tire shown in this figure has three grooves for the reception therein of three separate tread rings, one of which has been removed and the central one of which has been partially removed; five metallic elements are shown in staggered relationship in this figure.

Referring to the drawings in detail, the carrying casing or carcass 1 is provided with three annular grooves separated by the longitudinal ridges 6. The grooves are designed to receive therein two lateral rings 2 (only one of which is shown) and one central ring 3 (only half of which is shown). Each of the T-shaped metallic elements 4 is provided with portions 7, constituting the arms of the T, and a vertical rib 8 which carries the point 5.

As best shown in Figure 1 the ridges 6 are provided with a series of interruptions which are circumferentially spaced around the tire and which have a width corresponding to the length of the vertical rib 8 at its point of connection with the arms 7 of the metallic element. The thickness of the rib 8 is substantially equal to that of the ridge 6. The height of the rib 8 is such that the point 5 will project outwardly from the tire beyond the tread rings 3. The points 5 preferably are very hard having a high resistance to abrasion. These points 5 will project into the ice and snow on the roads thus enabling the operation of the vehicle on ice or snow.

Figure 2:
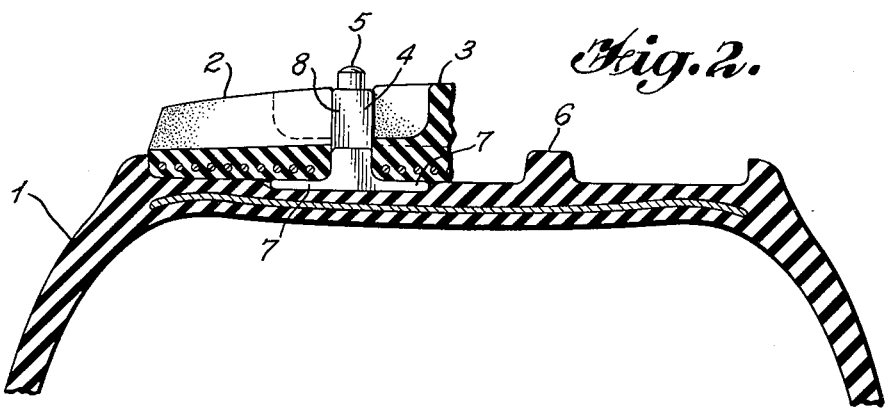
Figure 2 represents a section of the carcass taken along section line 2—2 of Figure 1.
Figure 3:
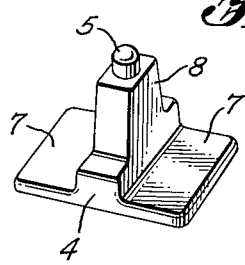
Figure 3 is a perspective view of one of the metallic elements.

As best shown in Figure 2, it is unnecessary to provide recesses or depressions in the annular grooves for the metallic elements, because the rubber portion of the tire beneath the arms 7 of the metallic elements will be depressed, due to its normal elasticity, by the pressure exerted on the upper surfaces of the arms 7 from the tread rings 2 and 3.

For the purpose of preventing the metallic elements from rusting, these may be covered with a rubber layer. If desired, the latter may be employed in conjunction with one of several well known cements used for bonding rubber to metal.

Other and further modifications of the present invention, apart from those shown or suggested herein, may be made within the spirit and scope of this invention.

What is claimed is:

1. In a pneumatic tire having a carcass and a separate tread mounted thereon, said tread being composed of a plurality of rings provided with resistance elements which render said rings substantially inextensible in the longitudinal direction, said carcass having a plurality of longitudinal peripheral ridges, said ridges being spaced from one another in lateral direction so as to form longitudinal grooves for receiving said tread rings, the improvement comprising a plurality of metallic elements having a T-shaped section, said metallic elements being separated both from the carcass and the tread rings and being inserted in interruptions provided in said ridges of the carcass, said interruptions having a length corresponding to the length of the metallic elements, each of said metallic elements being held in place against the carcass by two adjacent rings which bear against the two arms of the T, each metallic element being provided with a point projecting outwardly beyond said tread rings.

2. In a pneumatic tire having a radial carcass and a separate tread mounted thereon, said tread being composed of a plurality of rings provided with elements which render said rings substantially inextensible in the longitudinal direction, said carcass having a plurality of longitudinal peripheral ridges, said ridges being spaced from one another in lateral direction so as to form longitudinal grooves for receiving said tread rings and a breaker strip in said carcass, said breaker strip comprising cords crossed and inclined with respect to the mid-circumferential plane of the tire at angles ranging between 35° and 60° and arranged below the bottoms of said grooves, the improvement comprising a plurality of metallic elements having a T-shaped section, said metallic elements being separated both from the carcass and the tread rings and being inserted in interruptions provided in said ridges of the carcass, said interruptions having a length corresponding to the length of the metallic elements, each of said metallic elements being held in place against the carcass by two adjacent rings which bear against the two arms of the T, each metallic element being provided with a point projecting outwardly beyond said tread rings.

3. A pneumatic tire as set forth in claim 2 characterized in that there are more than two tread rings and that the interruptions in the longitudinal ridges are in staggered relationship.

4. A pneumatic tire as set forth in claim 2 characterized in that the points on the metallic element are of great hardness and are highly resistant to abrasion.

5. A pneumatic tire as set forth in claim 2 characterized in that the metallic elments are protected by a rubber covering.

References Cited in the file of this patent

UNITED STATES PATENTS

| | | |
|---|---|---|
| 2,254,329 | Stephens | Sept. 2, 1941 |
| 2,652,876 | Eisner | Sept. 22, 1953 |
| 2,704,564 | Christensen | Mar. 22, 1955 |